United States Patent [19]

Keiser

[11] 4,041,974
[45] Aug. 16, 1977

[54] MOBILE TOWER

[76] Inventor: Keril M. Keiser, 409 N. Washington Ave., Glendora, Calif. 91740

[21] Appl. No.: 660,422

[22] Filed: Feb. 23, 1976

[51] Int. Cl.² .............................................. B60P 3/22
[52] U.S. Cl. .................................... 137/344; 280/5 E; 280/491 R
[58] Field of Search ............ 137/344; 280/5 E, 491 R

[56] References Cited

U.S. PATENT DOCUMENTS

| 3,315,929 | 4/1967 | Keiser | 137/344 |
| 3,407,836 | 10/1968 | Keiser | 137/344 |

Primary Examiner—Alan Cohan
Assistant Examiner—Gerald A. Michalsky
Attorney, Agent, or Firm—Boniard I. Brown

[57] ABSTRACT

A mobile tower to be towed from one location of use to another by a vehicle having a rear trailer hitch. The tower has a wheeled base frame mounting a collapsible tower structure and a pivoted hitch tongue which is operatively connected to the tower structure for extension of the tongue into coupling engagement with the vehicle hitch upon lowering of the tower structure to a collapsed towing position and retraction of the tongue from coupling engagement with the hitch upon raising of the tower structure to its erect position of use. The particular tower described is a mobile water tower wherein the wheels raise and lower with the tower structure and the hitch tongue undergoes downward extension movement and upward retraction movement in a manner such that the base frame is lowered into supporting contact with the ground when the tower structure is raised to its position of use and raised to an elevated position wherein the frame is supported above the ground by the wheels and the towing vehicle when the tower structure is collapsed for travel.

6 Claims, 6 Drawing Figures

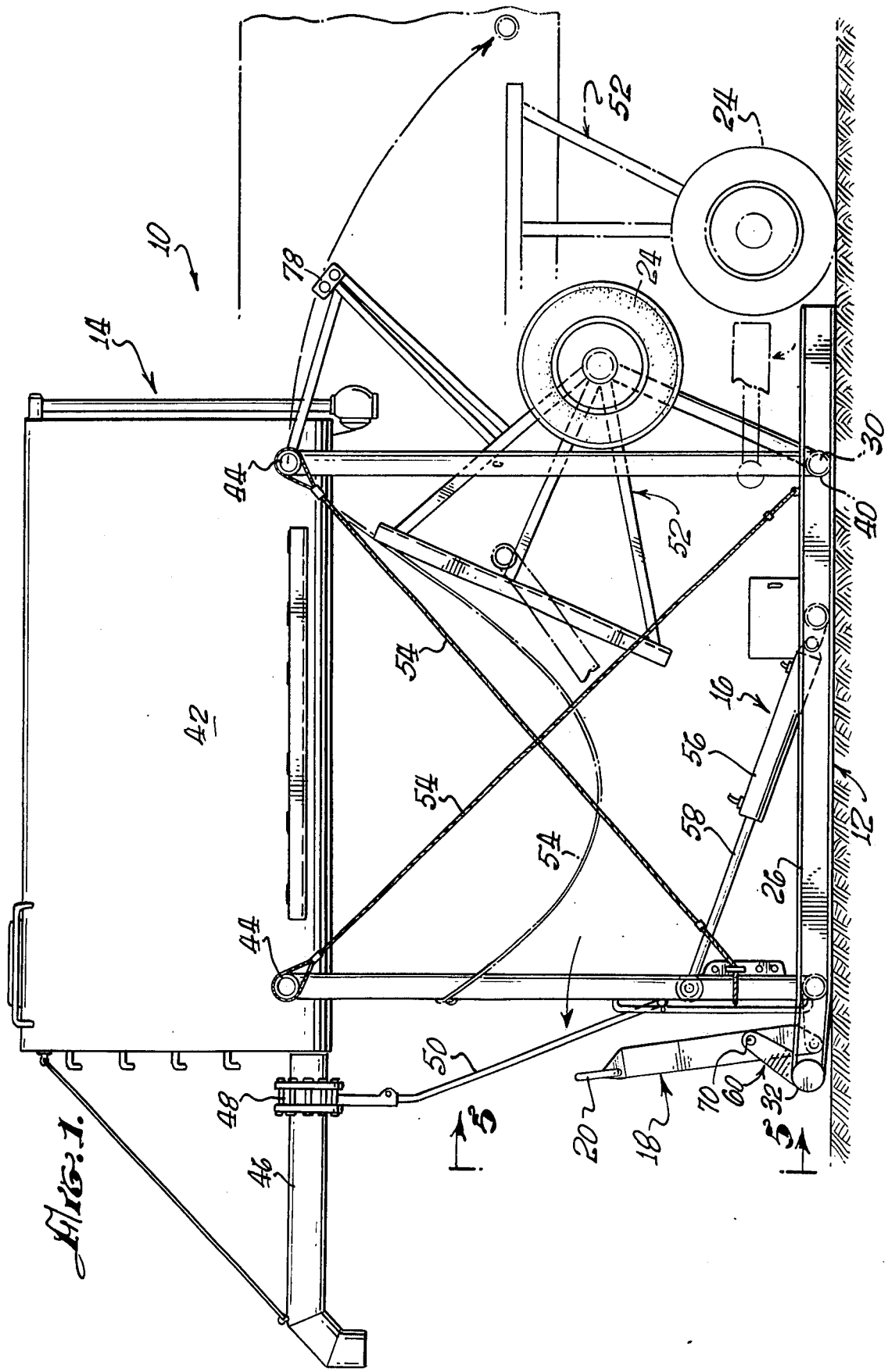

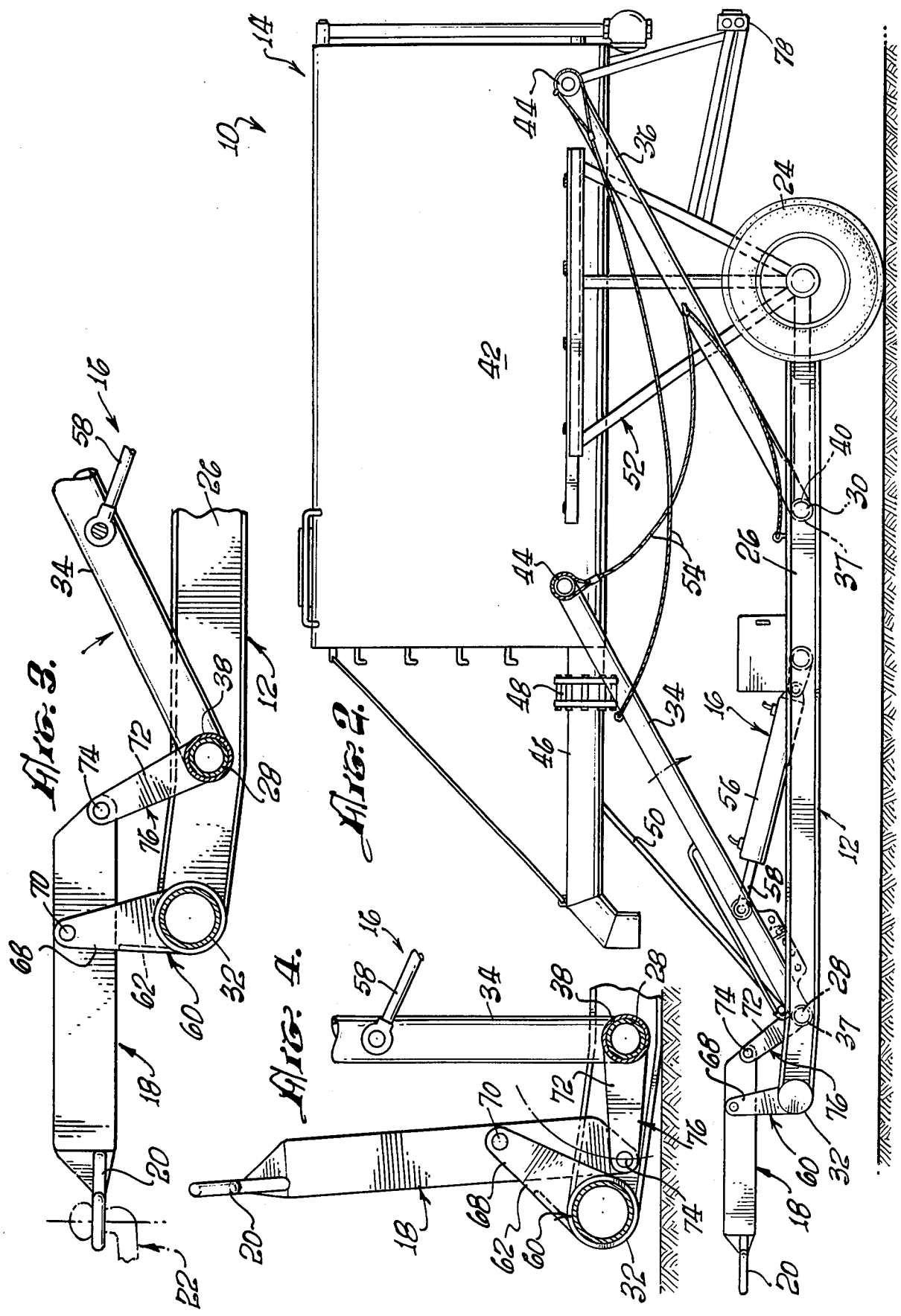

MOBILE TOWER

BACKGROUND OF THE INVENTION

1. Field of the Invention

This invention relates generally to mobile supports or towers and more particularly to improvements in mobile collapsible towers of the kind described in my earlier U.S. Pat. Nos. 3,315,921 and 3,407,836.

2. Discussion of the Prior Art

My prior patents referred to above describe mobile collapsible towers which may be utilized for various purposes but are designed primarily for use as water towers for servicing the water tank trucks, or water pulls as they are called, employed in land fill operations, that is, earth moving operations involving the leveling or raising the level of land areas.

One of the major problems associated with such a land fill is maintaining the proper moisture content of the soil in order to obtain the required degree of compaction of the soil. If the soil, in its native state, lacks the required moisture content, the land fill contractor must supplement the moisture by periodically wetting the soil as the land fill operation proceeds. Such additional water is deployed over the land fill area by means of water trucks which are commonly referred to in the trade as "water pulls".

The storage capacity of the water pull is limited, with the result that the pull must be perodically refilled during the course of a typical land fill. This periodic filling, or servicing, of a water pull creates a two-fold time loss involving the time required for the water pull to travel from its operating area to the water supply and back to the operating area, and the time required to actually refill or service the pull at the water supply. Moreover, many land fills are of such magnitude as to require the employment of a large number of water pulls. Servicing such a large number of water pulls introduces an additional time loss when it is necessary for the pulls to line up and wait their turn at the water supply, or supplies.

These time losses are minimized by using several mobile water towers placed at strategic locations about the fill. In this way, the time required for each water pull to travel from its operating area to a water tower and return is reduced and the tendency for the water pulls to line up at a water tower is minimized or eliminated. The use of a number of strategically located water towers spaced about a land fill site, therefore, is highly desirable.

In order to optimize effectiveness, water towers of the character described must satisfy certain requirements. Such water towers, for example, must be highly mobile so that they may be easily transported from one job site to another. Accordingly, the dimensions and weight of the tower, when conditioned for transportation, must satisfy the motor vehicle code specifications. The tower must also be capable of being towed and landed by a relatively light truck. In addition, the tower should be capable of being landed and erected on roughly cleared ground, such as ground which has been graded with a caterpiller and blade, without auxiliary ditching or hand shoveling. Such landing and erection capabilities of the tower should exist on both level land and mild slopes. Finally, the tower must be capable of erection to a height such that its water tank is elevated a sufficient distance above the ground to position the down spout of the tank over the fill port of a water pull. Preferably, the tower should be capable of being quickly erected and collapsed by one man.

The mobile collapsible water towers described in my above mentioned prior patents are uniquely constructed for such land fill operations. The present invention provides certain improvements in towers of the kind described in the patents which enhance their efficiency for land fill operations and the other uses for which such towers may be employed.

SUMMARY OF THE INVENTION

The present improved mobile tower embodies a basic tower construction similar to that of the towers described in my prior patents. Thus, the present tower has a base frame with front and rear ends and normally upper and lower sides. At the upper side of the frame is a collapsible tower structure including front and rear supporting legs which are pivotally connected at their lower ends to the frame and at their upper ends to a connecting member in such a way that the tower structure is swingable forwardly and upwardly relative to the frame to an erect position of use and rearwardly and downwardly to a collapsed towing position. An actuator, such as a hydraulic piston and cylinder, is provided for effecting movement of the tower structure between its towing and use positions. The particular tower described is a water tower for land fill operations and the upper connecting member of the tower structure is a water tank having a water spout containing a valve for filling the water pulls employed in land fill operations.

At the front end of the tower base frame is a hitch tongue having coupling means for releasable engagement with a rear trailer hitch on a truck or other vehicle for towing the tower from one location of use to another. The tower is equipped with ground wheels for supporting the tower while it is being towed.

As thus far described, the tower is essentially identical to those described in my prior patents. According to a primary feature of the present invention, the front hitch tongue is movably mounted on the base frame for extension and retraction relative to the frame and is operatively connected to the collapsible tower structure in such a way that when the tower is disposed in towing relation behind a towing vehicle, elevation of the tower structure to its erect use position effects extension of the hitch tongue into coupling engagement with the vehicle hitch and lowering of the tower structure to its collapsed towing position effects retraction of the tongue from coupling engagement with the hitch.

In the particular mobile water tower described, the ground wheels are mounted to raise and lower with the tower structure in the same manner as in my prior patents, such that when the tower structure is raised for use, the wheels elevate and lower the rear end of the tower base frame into supporting contact with the ground. When the tower is lowered for towing, the wheels descend into supporting contact with the ground and elevate the rear end of the frame out of contact with the ground. The hitch tongue is pivotally mounted on the front end of the base frame and is pivotally connected to the collapsible tower structure in such a way that when the tower structure occupies its collapsed position, the tongue assumes a generally horizontal position wherein it supports the front end of the base frame in an elevated position above the ground when the tongue coupling means is engaged with the towing vehicle hitch. Raising of the tower structure to its erect position of use effects upward pivotal retraction of the tongue in a manner which results in initial lowering of the front end of the base frame into supporting contact with the ground and following upward disengagement of the hitch tongue coupling means from the vehicle hitch. Lowering of the tower to its collapsed position effects downward pivotal extension of the tongue in a manner which results in initial downward engagement of the tongue coupling means with the vehicle hitch and following elevation of the front frame end above the ground. Thus, the tower base frame is lowered into supporting contact with the ground and concurrently uncoupled from the towing vehicle when the tower structure is raised to its erect use position and the frame is elevated off the ground and coupled to the towing vehicle when the tower structure is lowered to its collapsed towing position.

BRIEF DESCRIPTION OF THE DRAWINGS

FIG. 1 is a side elevation of a portable tower, in this instance a portable water tower, according to the invention showing, in solid lines the tower in its erect configuration of use and, in broken lines, the tower in its collapsed towing configuration;

FIG. 2 is a side elevation of the tower in its travel configuration;

FIG. 3 is an enlarged fragmentary detail in side elevation of the tower hitch tongue and the tongue extension and retraction means; with the tongue shown in its horizontal extended towing position;

FIG. 4 is a view similar to FIG. 3 showing the hitch tongue in its retracted position;

DESCRIPTION OF THE PREFERRED EMBODIMENT

Figure 5:
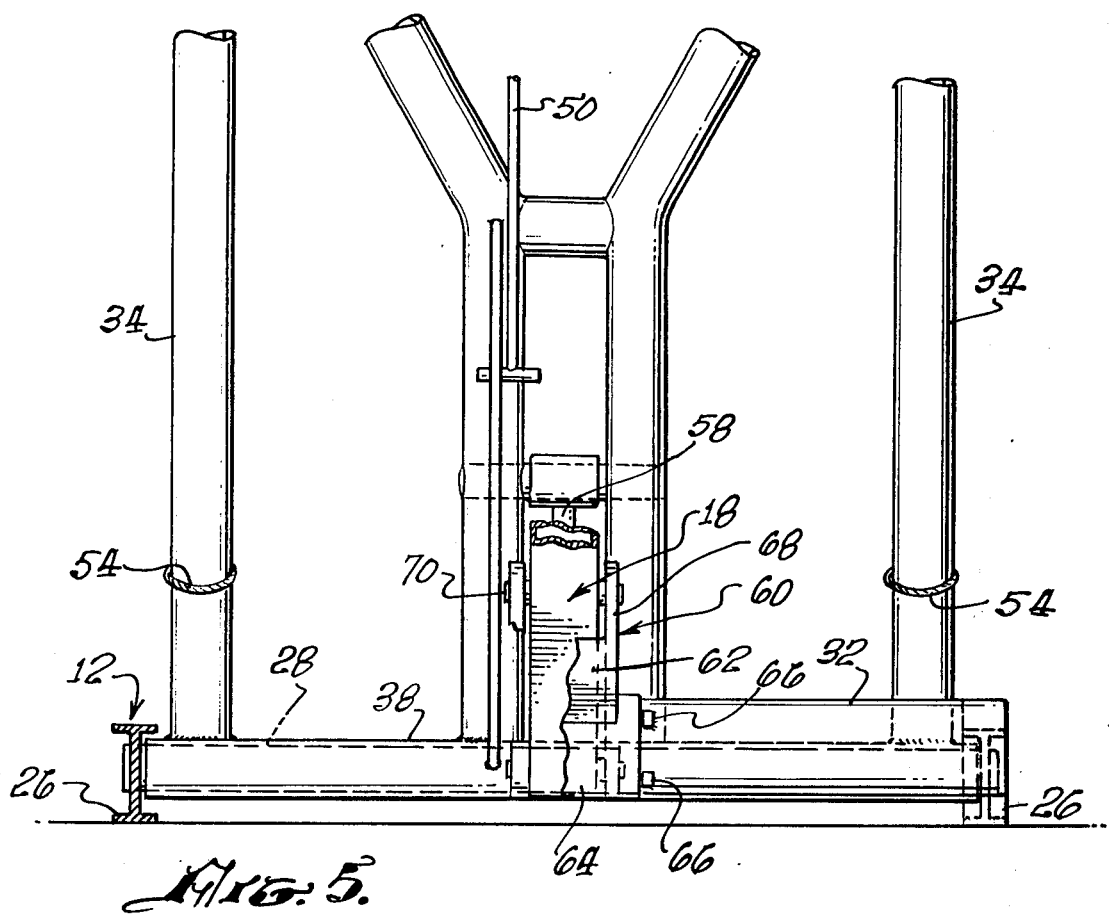
FIG. 5 is an enlarged front view of the tower taken on line 5—5 in FIG. 1.

In general terms, the illustrated mobile tower 10 of the invention comprises a base frame 12 having front and rear ends and normally upper and lower sides, a collapsible tower structure 14 above the frame, actuator means 16 for effecting raising and lowering of the tower structure between its erect position of FIG. 1 and its collapsed position of FIG. 2, a hitch tongue 18 at the front end of the frame having coupling means 20 for engagement with the trailer hitch 22 of a towing vehicle, and ground wheels 24 at the rear of the frame for supporting the tower while it is being towed by the vehicle. Except for the manner in which the hitch tongue 18 is mounted on the frame 12 and the manner in which the actuator means 16 is connected to the tower structure 14, the above basic tower construction is very similar to those described in my earlier mentioned prior patents. Accordingly, it is unnecessary to describe this basic tower construction in elaborate detail.

Suffice it to say that the base frame 12 has longitudinal frame members 26 rigidly joined at their front and rear ends by tubular cross members or tubes 28, 30, 32. The collapsible tower structure 14 comprises front and rear supporting legs 34, 36 pivotally joined at their lower ends to the frame 12 by pivotal connections 37 formed by sleeves 38, 40 which are welded or otherwise rigidly secured to the lower ends of the legs and are rotatably supported on the frame cross tubes 28, 30, respectively, between the longitudinal frame members 26. Extending between the upper ends of the legs 34, 36 is a connecting member 42 which is attached to the upper leg ends by pivotal connections 44. The particular tower 10 illustrated is a water tower for land fill operations of the kind discussed earlier, and the connecting member 42 is a water tank forward spout 46 containing a shut-off valve 48 operable by a valve actuating rod 50.

The pivot axes of the pivot connections 37, 44 parallel one another and extend transversely of the base frame 12. Accordingly, the tower structure 14 is swingable forwardly and upwardly relative to the frame 12 to the erect position of use of the tower structure shown in solid lines in FIG. 1. The tower structure is swingable rearwardly and downwardly relative to the frame to the collapsed towing position of the tower structure shown in FIG. 2. In the erect use position of the structure, its legs 34, 36 stand upright on the frame 12. In the collapsed position of the structure, its legs incline rearwardly of the frame, as shown.

The rear ground wheels 24 of the tower 10 are mounted on a carriage 52 which is rigidly attached to the rear legs 36 of the tower structure 14 in such a way that the wheels raise and lower with the structure relative to the frame 12, in the manner explained more fully in my earlier mentioned patents. Thus, when the tower structure is raised, the wheels elevate relative to the frame, thereby lowering the rear frame end into supporting contact with the ground, as shown in FIG. 1. When the tower structure is lowered, the wheels lower relative to the frame into supporting contact with the ground and elevate the rear frame end above the ground to the final, fully collapsed position of FIG. 2, wherein the tank 42 is supported on the wheel carriage 52, as shown in FIG. 2.

Raising and lowering of the tower structure 14 between its erect position of FIG. 1 and its collapsed position of FIG. 2 is accomplished by the actuating means 16. The tower structure is retained in its erect position by the actuating means and by cables 54 which are attached to the erect tower legs 34, 36 in the manner shown in FIG. 1 to effectively brace the legs in their upright positions.

The mobile tower construction 10 as described to this point is essentially identical to those described in my earlier mentioned patents. One difference between the present tower and that described in my U.S. Pat. No. 3,407,836 resides in the fact that the actuating means 16 is permanently connected between the base frame 12 and the front tower legs 34. The particular actuating means shown is a hydraulic actuator including a cylinder 56 pivotally attached to the frame and a ram 58 pivotally attached to the front legs, such that extension of the actuator raises the tower structure 14. Lowering of the structure is effected by the combined action of gravity and retraction of the actuator.

Figure 6:
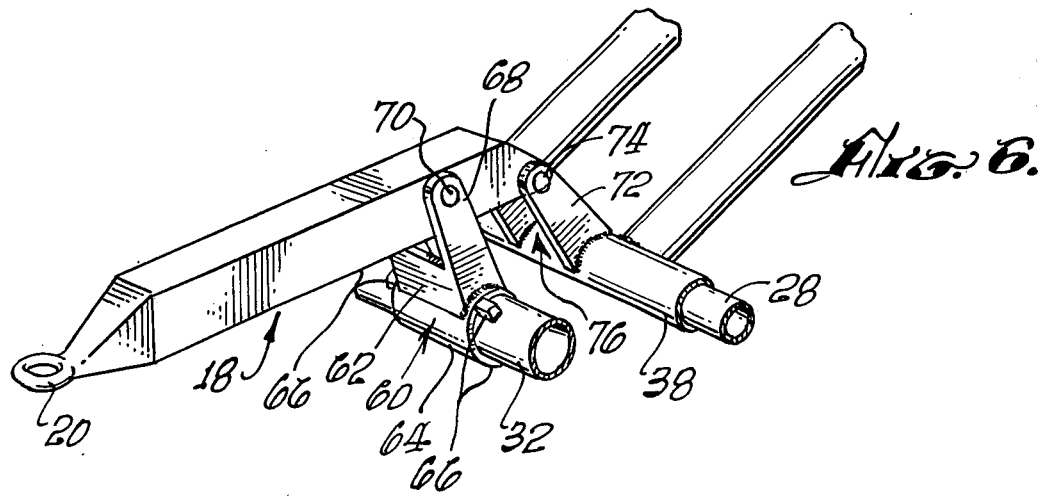
FIG. 6 is an enlarged perspective view of the hitch tongue and tongue extension and retraction means.

The primary tower improvement of the present invention resides in the arrangement of the tower hitch tongue 18 which, as noted earlier, includes a coupling means 20 for engagement with a trailer hitch 22 on a vehicle for towing the tower from one location of use to another. This improved hitch tongue arrangement will now be described by reference primarily to FIGS. 3, 4, 5 and 6.

Hitch tongue 18 comprises a metal bar which is aligned in the longitudinal center plane of the tower pase frame 12 and is pivotally supported on the front frame cross tube 32 by means 60. This tongue supporting means comprises a yoke 62 rigid on a sleeve 64 which is rotatably mounted on the center of the tube 32.

Lugs 66 on the tube position the sleeve axially on the tube. Yoke 62 has arms 68 which straddle the hitch tongue 18 between its ends and close to its rear end and are pivotally attached to the tongue by a pivot 70 whose axis parallels the pivot axis of the tower structure 14. Rigid on the front tower pivot sleeve 38 are a pair of arms 72 which extend substantially normal to the front tower legs 34 and straddle the rear end of the tongue 18. Arms 72 are attached to the tongue 18 by a pivot 74 parallel to pivot 70. Arms 72 and pivot 74 thus provide a connection 76 between the tongue and the tower structure 14.

The tongue arrangement described above is such that raising of the tower structure 14 to its erect position rotates the hitch tongue 18 upwardly to its upstanding retracted position of FIGS. 1 and 4. Lowering of the tower structure to its collapsed position rotates the tongue downwardly to its horizontal towing position of FIGS. 2 and 3. In this latter towing position of the tongue, its coupling means 20, which is a ring, is disposed for engagement over the hitch 22 of a towing vehicle. This engagement of the tongue with the vehicle hitch supports the front end of the tower base from 12 in an elevated position above the ground. From the earlier descriptions, it will be recalled that when the tower structure 14 is collapsed, the rear end of the frame is supported above the ground on the wheels 24. Accordingly, lowering of the tower structure conditions the mobile tower 10 to be towed by the towing vehicle.

Assume now that the tower structure 14 is raised to its erect position of FIG. 1 with the hitch tongue 18 coupled to the towing vehicle hitch 22. As the tower structure elevates, the tongue undergoes upward rotation relative to the frame 12. This relative upward rotation of the tongue results in initial lowering of the front frame end into supporting contact with the ground and thereafter in upward disengagement of the tongue coupling ring 20 from the vehicle hitch 22 during final upward rotation of the tongue to its fully retracted position of FIGS. 1 and 4. Lowering of the tower structure 14 with the tower 10 in towing relation behind the towing vehicle causes initial downward rotation of the hitch tongue to a position wherein the tongue coupling ring engages downwardly over the vehicle hitch 22 and thereafter in elevation of the front end of the frame 12 off the ground during final rotation of the tongue to its fully extended position of FIGS. 2 and 3. From the earlier description, it will be recalled that the rear end of the frame is lowered into contact with the ground when the tower structure 14 is raised, and raised from contact with the ground into supporting relation on wheels 24 when the tower structure is lowered.

It will not be understood that assuming the tower 10 is initially in its erect use configuration of FIG. 1, coupling of the tower to a towing vehicle for transportation to another location of use is accomplished by backing the vehicle into towing relation to the front end of the tower frame 12 and then operating the tower actuator 16 to lower the tower structure 14 to its collapsed position. During this lowering operation, the rear frame is raised off the ground onto the wheels 24, the hitch tongue 18 is rotated downwardly into engagement with the vehicle hitch 22 and the front frame end is elevated off the ground to permit towing of the tower by the vehicle. When the tower structure is raised at the new location of use, the hitch tongue is disengaged upwardly from the vehicle hitch and the base frame is lowered into supporting contact with the ground.

According to another feature of the invention, a rear reflector or tail light support 78 may be attached to the tower structure 14 and the wheel carriage 52 in the manner shown in FIGS. 1 and 2 to assume an operative position at the rear of the tower 10 when the latter is placed in its towing configuration of FIG. 2.

The inventer claims:
1. A mobile tower comprising:
   a base frame having front and rear ends and upper and lower sides,
   a hinged collapsible tower structure on said frame including front and rear supporting legs at the front and rear ends of said frame having normally upper and lower ends, a connecting member extending between the upper ends of said legs, pivotal connections between said frame and the lower ends of said legs, pivotal connections between said member and the upper ends of said legs, said pivotal connections having parallel pivot axes extending transversely of said frame, whereby said tower structure is swingable forwardly and upwardly to an erect position of use over said frame wherein said legs are disposed in upstanding positions relative to said frame and said structure is swingable rearwardly and downwardly to a collapsed towing position wherein said legs incline rearwardly of said frame, and actuator means for effecting movement of said tower structure between said positions,
   a pair of ground wheels,
   means mounting said wheels on said frame for relative vertical movement of said wheels and frame concurrently with raising and lowering of said tower structure in a manner such that said wheels are raised from and the lower side of the frame is lowered into supporting contact with the ground during elevation of said tower structure to its erect position and said wheels are lowered into and the rear frame end is raised from supporting contact with the ground during lowering of said tower structure to its collapsed position to permit towing of said tower by a vehicle having a trailer hitch,
   a hitch tongue at the front end of said frame including coupling means for releasible engagement with said vehicle trailer hitch,
   means mounting said tongue on said frame for movement between extended and retracted positions in a manner such that when said tower is disposed in towing relation behind said vehicle said tongue coupling means is engageable with said vehicle trailer hitch by extension of said tongue and said coupling means disengageable from said hitch by retraction of said tongue, said tongue mounting means comprising a first arm swingably mounted at one end on the front end of said frame on a pivot axis parallel to said supporting leg pivot axes, and means pivotally connecting the other end of said arm to said tongue between the tongue ends on a pivot axis parallel to said leg pivot axes, and
   connecting means joining said tongue and tower structure for retraction of said tongue by elevation of said tower structure to its erect position and extension of said tongue by lowering of said tower structure to its collapsed position, said connecting means comprising a second arm rigidly joined to said front supporting legs and extending transversely of said front legs forwardly toward said tongue, and means pivotally connecting the front end of said second arm to the rear end of said tongue on a pivot axis parallel to said leg pivot axes.

2. A mobile tower according to claim 1 wherein:

said tongue when in extended position with said coupling means engaged with said vehicle trailer hitch supports the front end of said frame in an elevated towing position above the ground, and said tongue undergoes downward extension movement and upward retraction movement relative to said frame in a manner such that retraction of said tongue from its extended position with said coupling means engaged with said vehicle hitch effects initial lowering of the front frame end into supporting contact with the ground and following upward disengagement of said coupling means from said hitch, and extension of said tongue from its retracted position effects initial downward engagement of said coupling means with said hitch and following elevation of the front frame end to its elevated towing position.

3. A mobile tower according to claim 1, wherein:

said tower comprises a portable collapsible water tower for use at construction sites and the like, and said connecting member comprises a water tank having a discharge spout and a valve for said spout.

4. A mobile tower according to claim 1, wherein:

said tongue undergoes downward extension movement and upward retraction movement relative to said frame in a manner such that retraction of said tongue with said coupling means engaged with said vehicle hitch effects upward disengagement of said coupling means from said hitch and extension of said tongue effects downward engagement of said coupling means with said hitch.

5. A mobile tower comprising:

a base frame having front and rear ends and upper and lower sides, a hinged collapsible tower structure on said frame including front and rear supporting legs at the front and rear ends of said frame having normally upper and lower ends, a connecting member extending between the upper ends of said legs, pivotal connections between said frame and the lower ends of said legs, pivotal connections between said member and the upper ends of said legs, said pivotal connections having parallel pivot axes extending transversely of said frame, whereby said tower structure is swingable forwardly and upwardly to an erect position of use over said frame wherein said legs are disposed in upstanding positions relative to said frame and said structure is swingable rearwardly and downwardly to a collapsed towing position wherein said legs incline rearwardly of said frame, and actuator means for effecting movement of said tower structure between said positions, a pair of ground wheels, means mounting said wheels on said frame for supporting contact of said wheels with the ground when said tower structure is collapsed to permit towing of said tower by a vehicle having a trailer hitch, a hitch tongue at the front end of said frame including coupling means for releasable engagement with said vehicle trailer hitch, means mounting said tongue on said frame for movement between extended and retracted positions in a manner such that when said tower is disposed in towing relation behind said vehicle said tongue coupling means is engageable with said vehicle trailer hitch by extension of said tongue and said coupling means is disengageable from said hitch by retraction of said tongue, said tongue mounting means comprising a first arm swingable mounted at one end on the front end of said frame on a pivot axis parallel to said supporting leg pivot axes, and means pivotally connecting the other end of said arm to said tongue between the tongue ends on a pivot axis parallel to said leg pivot axes, connecting means joining said tongue and tower structure for retraction of said tongue by elevation of said tower structure to its erect position and extension of said tongue by lowering of said tower structure to its collapsed position, and said tongue undergoing downward extension movement and upward retraction movement relative to said frame in a manner such that retraction of said tongue with said coupling means engaged with said vehicle hitch effects upward disengagement of said coupling means from said hitch and extension of said tongue effects downward engagement of said coupling means with said hitch.

6. A mobile tower according to claim 5, wherein:

said tower comprises a portable collapsible water tower for use at construction sites and the like, and said connecting member comprises a water tank having a discharge spout and a valve for said spout.

* * * * *